(12) United States Patent
Overhoff et al.

(10) Patent No.: US 7,726,341 B2
(45) Date of Patent: Jun. 1, 2010

(54) MULTI-WAY VALVE

(75) Inventors: Klaus-Jürgen Overhoff, Leverkusen (DE); Harald Urbanski, Siegburg (DE)

(73) Assignee: Numatics GmbH, Sanki Augustin (DE)

( * ) Notice: Subject to any disclaimer, the term of this patent is extended or adjusted under 35 U.S.C. 154(b) by 691 days.

(21) Appl. No.: 11/599,768

(22) Filed: Nov. 15, 2006

(65) Prior Publication Data

US 2007/0209722 A1    Sep. 13, 2007

(30) Foreign Application Priority Data

Mar. 10, 2006    (DE) .................. 10 2006 011 578

(51) Int. Cl.
*F15B 13/043* (2006.01)
(52) U.S. Cl. .................. 137/625.64; 137/625.69
(58) Field of Classification Search ............ 137/625.64, 137/625.69
See application file for complete search history.

(56) References Cited

U.S. PATENT DOCUMENTS

| | | | | | |
|---|---|---|---|---|---|
| 3,043,335 A | * | 7/1962 | Hunt | .................. | 137/596.15 |
| 3,131,722 A | * | 5/1964 | Abbott et al. | ............ | 137/625.6 |
| 3,347,259 A | * | 10/1967 | Lansky et al. | ............... | 137/269 |
| 3,458,769 A | * | 7/1969 | Stampfli | .................. | 361/147 |
| 4,978,130 A | * | 12/1990 | Farler | .................. | 473/586 |
| 6,237,635 B1 | * | 5/2001 | Nambu | .................. | 137/625.69 |

FOREIGN PATENT DOCUMENTS

| | | |
|---|---|---|
| DE | 3502589 A1 | 8/1986 |
| DE | 3744026 A1 | 7/1988 |
| FR | 1604915 | 6/1972 |
| JP | 01229176 A | 9/1989 |

* cited by examiner

*Primary Examiner*—John Rivell
*Assistant Examiner*—Craig M Schneider
(74) *Attorney, Agent, or Firm*—Reising Ethington P.C.

(57) ABSTRACT

A multi-way valve has a housing with a stepped bore forming two piston guiding regions and a shoulder ring with two sealing shoulders. The housing also has a first, second and central transverse bores which are spaced along the cylindrical bore. A contact piston has a piston rod and sealing members secured thereon. The guide members are pressed fit onto opposite ends of the piston rod.

19 Claims, 3 Drawing Sheets

US 7,726,341 B2

MULTI-WAY VALVE

REFERENCE TO RELATED APPLICATION

Applicants claim the priority of German Application, Serial No. 10 2006 011 578.3, filed Mar. 10, 2006.

TECHNICAL FIELD

The field of this invention relates to a multi-way valve, more particularly a 3/2-way valve for controlling compressed air.

BACKGROUND OF THE DISCLOSURE

An example of a directional multi-way valve is known from DE 200 23 376 U1. At its two axial ends, the piston rod is guided in guiding bores in the cover parts of the housing. This construction involves additional machining of the respective guiding bores in the cover parts, and also requires an accurate fit of the cover parts relative to the housing in order to ensure an aligned coaxial position of the guiding bores relative to one another and of the guiding bores relative to the continuous axial housing bore.

What is needed is a directional multi-way valve which may be expeditiously constructed.

SUMMARY OF THE DISCLOSURE

In accordance with one embodiment of the invention, a multi-way valve has a housing with a stepped bore which forms two piston guiding regions and a shoulder ring with two sealing shoulders. Three transverse bores are spaced along the cylindrical bore and intersect the cylindrical bore. A control piston has a piston rod and sealing members secured thereon; wherein, depending on its position, one sealing member each rests against one of the sealing shoulders for the purpose of sealing off a first outer transverse bore from a central transverse bore and wherein the other sealing member is disengaged from the associated sealing shoulder for fluid communication between the central transverse bore and the second outer transverse bore. The guiding members for guiding the control piston in the bore are pressed by means of a press fit onto the piston rod at both ends of the piston rod.

It is thus possible with this embodiment to eliminate guiding bores in the cover parts without the need for additional machining operations in other areas. The guiding members can be provided in the form of plastic parts, so that mechanical machining processes do not have to take place on the components. In one embodiment, additional sealing members are mounted by way of a press fit on the piston rod and are directly supported on the shoulders of the piston rod. Alternatively, the guiding members can be produced directly as sealing members which sealingly rest against the sealing shoulders of the shoulder ring.

In one embodiment, the bores have generally circular cross-sectional shapes and the shoulders are annular. According to a preferred embodiment, the guiding members are each indirectly axially supported on annular shoulders at the piston rod, more particularly via annular-disc-shaped sealing members which, in turn, are directly supported on the annular shoulders of the piston rod.

In one embodiment, the control piston is provided in the form of a unilaterally acting control piston which operates against a helical pressure spring acting as a return spring. In this case, one of the guiding members is axially supported via helical pressure spring against a housing cover, whereas the other one of the guiding members is sealed by sealing members relative to its piston guiding range while forming a pressure chamber which is positioned opposite the helical pressure spring and which, by use of a pre-control valve, can optionally be loaded with control pressure or ventilated. The control pressure preferably corresponds to the operating pressure which is controlled by the multi-way valve.

The guiding member preferably is made from plastic. The sealing members which accommodate the axial contact forces preferably are made from metal, so that sufficiently high axial forces can be transmitted via the respective press fits. The sealing members, on their sealing faces, carry preferably annular sealing elements which rest against the annular shoulders in the cylindrical bore. The guiding members and the sealing members can be sealed relative to one another on the piston rod by means of O-rings. The housing with the cylindrical bore and the transverse bores is preferably a light metal pressure die casting, more particularly an aluminum pressure die casting. The cover parts and adapter parts which are held in a largely force-free condition can be made from plastic.

In accordance with another aspect of the invention, a multi-way valve has an outer annular collar in the region of the shoulder ring on the piston rod. The outer annular collar is positioned axially between the sealing members and which is slideably and sealingly arranged with respect to the shoulder ring. In one embodiment, the shoulder ring has an inner annular collar which, more particularly, is positioned axially between the sealing shoulders and which is slideably and sealingly arranged with respect to the piston rod. In one embodiment, a combination of the above characteristics is provided such that an inner annular collar in the region of the shoulder ring and, in the region of the inner annular collar, there is provided an outer annular collar on the piston rod which, in the operating region of the control piston, is slideably and sealingly arranged with respect to the annular collar.

The purpose of these described constructions is to prevent the control slide from remaining in a central position between the transverse bores if, a pneumatic short-circuiting occurs as a result of a switching operation that is too slow which would cause a failure at the control of pressure at the central bore. Due to the pressure differential on both sides of the outer annular collar and a resulting additional axial force acting on the control slide, the pneumatic short-circuiting is prevented even if the spring force of the helical pressure spring is inadequate and/or if the pressure in the pressure chamber is inadequate, so that there is provided an increased operational safety in the case of control changes.

BRIEF DESCRIPTION OF THE DRAWINGS

A preferred embodiment of the invention is illustrated in the drawings and will be described below.

DETAILED DESCRIPTION OF THE PREFERRED EMBODIMENT

Figure 1A:
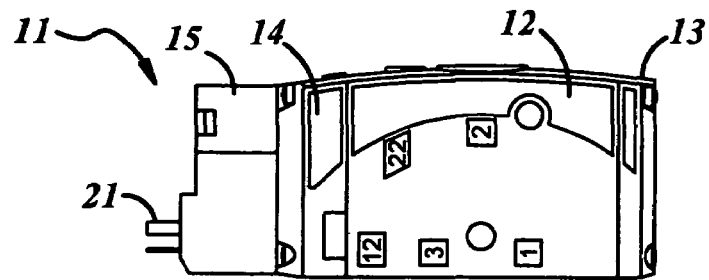
FIG. 1 show an embodiment of a multi-way valve in a plan view from five sides and two isometric illustrations, i.e.
 a) in a first side view
 b) in a plan view
 c) in a second opposite side view
 d) in a first end view
 e) in a second opposite end view
 f) in a perspective view of the upper side
 g) in a perspective view of the underside.
Figure 1D:
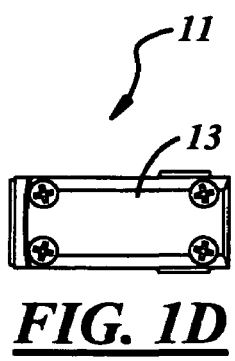
Figure 1B:
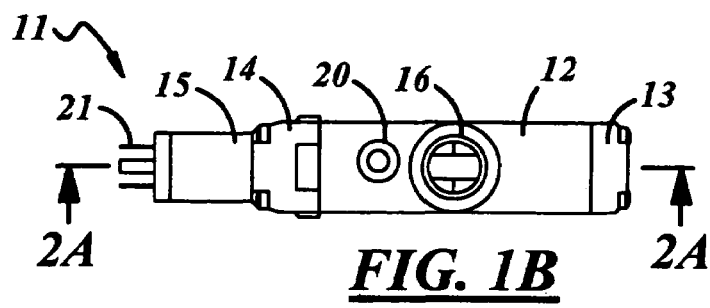
Figure 1C:
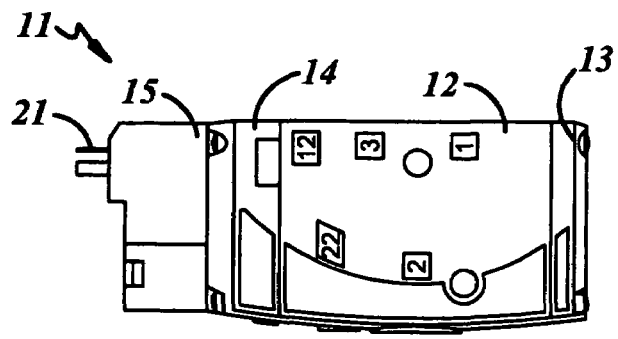
Figure 1E:
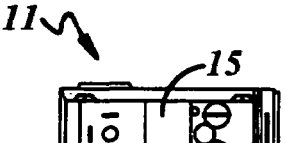
Figure 1F:
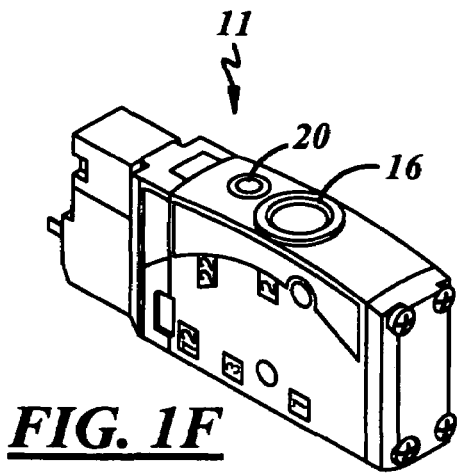
Figure 1G:
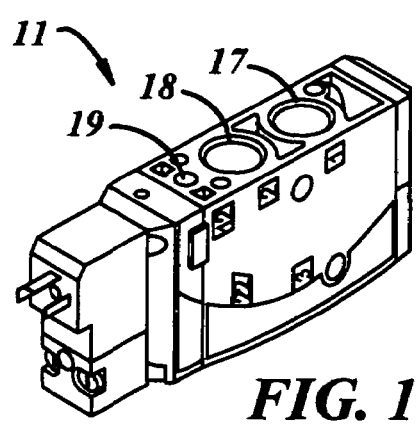

Referring now to FIGS. 1A-1G, a 3/2-way valve 11 has a housing 12 made of a pressure die casting material as well as two parts 13, 14 made from a plastic material. A cover 13 closes the housing towards the outside whereas an adapter block 14 forms the connection with an electrically controllable pre-control valve 15. The upper side is shown to comprise a transverse bore 16 for connecting to a work device (not shown). On the underside, there are two transverse bores 17, 18 of which the bore 17 is provided for a supply pressure connection and the bore 18 for a ventilation connection. The underside, furthermore, comprises a connecting bore 19 for an external connection for supplying the pre-control valve 15 via the adapter block 14. The upper side is shown to comprise a transverse bore 20 for venting the exhaust air of the pre-control valve 15 via the adapter block 14. The pre-control valve 15 is provided with connector contacts 21 intended for controlling purposes. The pre-control valve 15, in turn, is a 3/2-way valve.

Figure 2A:
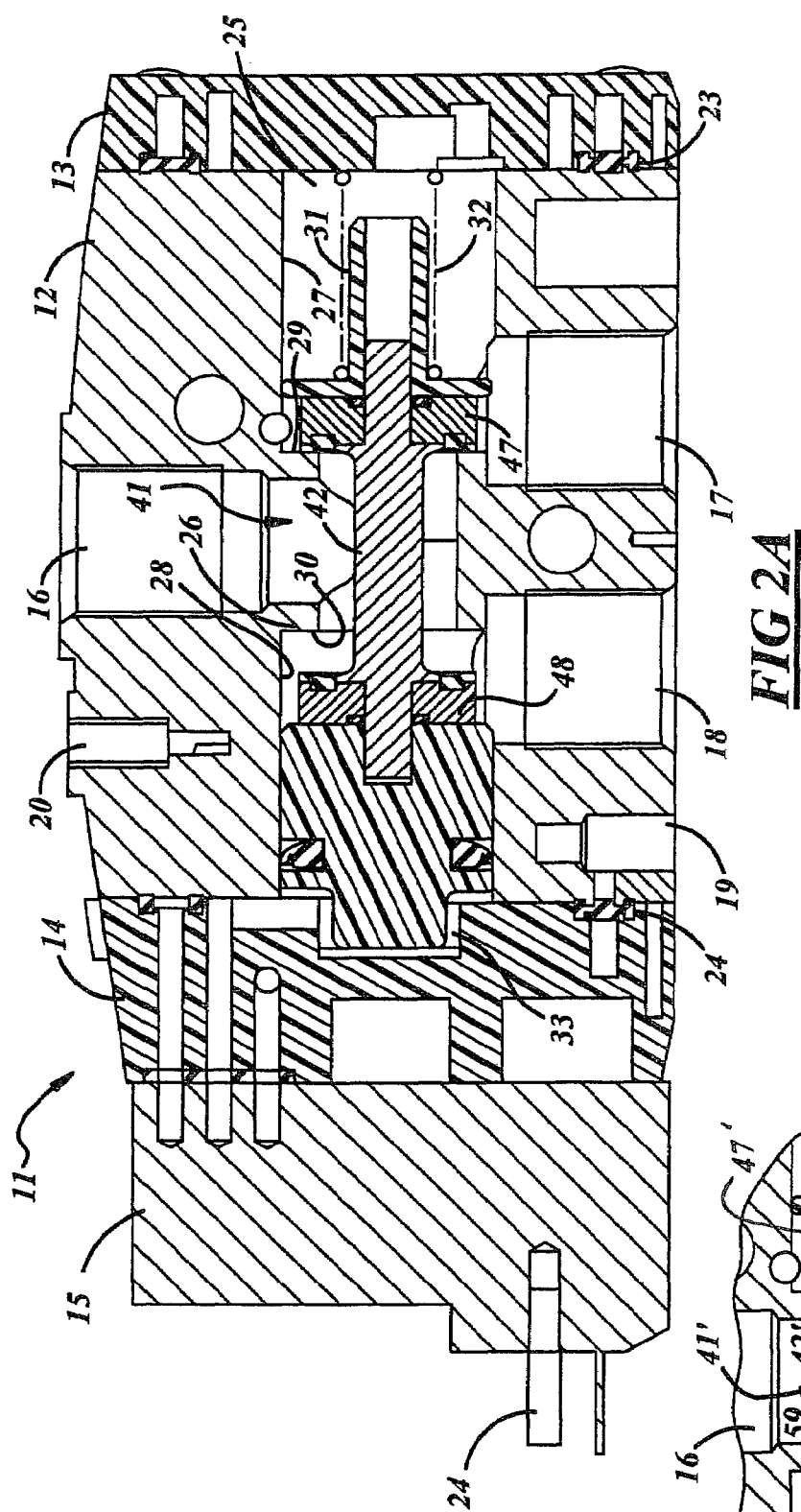
FIG. 2 shows a cross-sectional view of a multi-way valve along lines 2A-2A shown in FIG. 1B
 a) in a first embodiment in an overall view
 b) in a fragmentary view of a second embodiment

FIG. 2A shows the housing 12, the cover 13, the adapter block 14 as well as the pre-control valve 15 with its connector contacts 21 along a longitudinal section. The cover 13 is sealed by seal 23 relative to the housing 12 and the adapter block 14 is sealed via seal 24. The housing 12 is shown to comprise a longitudinally extending cylindrical bore 25 therethrough and which has a shoulder ring 26 with a reduced diameter. The above mentioned transverse bores 16, 17 and 18 arranged at axial distances relative to the longitudinal axis end in the cylindrical bore 25. The cylindrical bore 25 is widened at both ends relative to the shoulder ring 26 in order to form guiding regions 27, 28. In the cylindrical bore 25, there is positioned a control piston 41 which, on a piston rod 42, carries two sealing members 47, 48 which, as a function of the axial position of the piston, alternately come to rest against two sealing shoulders 29, 30 of the shoulder ring 26 at the ends of the guiding regions 27, 28. In the position shown in FIG. 2A, the sealing member 47 rests against the sealing shoulder 29, whereas the second sealing member 48 releases the sealing shoulder 30. In this case, the transverse bore 17 to be connected to the supply pressure connection is disconnected from the transverse bore 16 supplying the work device, whereas the transverse bore 18 to be connected to the ventilation line is connected to the transverse bore 16 leading to the work device. The control piston 41 as illustrated is biased by a pressure spring 32 which moves the piston to the left when a cylindrical chamber 33 positioned on the opposite side to the left of the control piston 41 is not pressurized.

If the cylindrical chamber 33 is pressurized, the control piston 41 is displaced towards the right and the helical pressure spring 32 is compressed until the control piston abuts the cover part 13 on its right hand side. In this position, the sealing member 48 seals the sealing face 30, and the sealing face 29 is released by the sealing member 48. In this position, which is not illustrated, the transverse bore 16 for connecting the work device is connected to the transverse bore 17 for the supply pressure connection, whereas the transverse bore 18 for the ventilation line is disconnected from the transverse bore 16 leading to the work device.

Figure 2B:
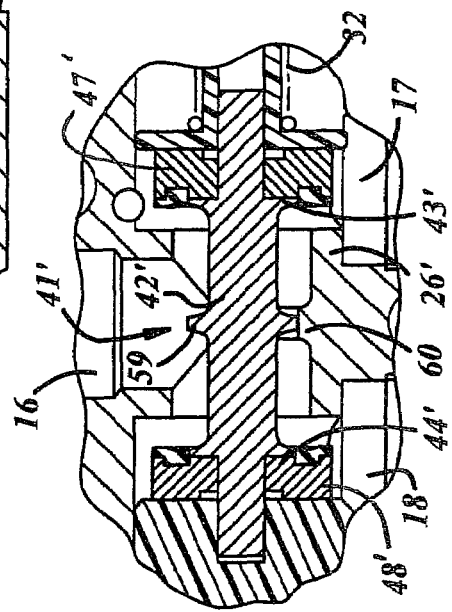

Whereas in FIG. 2A die piston rod 42 of the control piston 41 between two supporting shoulders 43, 44 for the sealing members 47, 48 is cylindrical with a constant outer diameter and whereas, equally, the inner diameter of the shoulder ring 26 between the sealing faces 29, 30 is constant, in FIG. 2B the piston rod 42', centrally between the supporting shoulders 43', 44' for the sealing members 47', 48', is provided with an outer annular collar 59 which is sealingly displaceable inside an inner annular collar 60 which reduces the inner diameter of the shoulder ring 26'. As the transverse bore 16 meets the annular collar 60, the latter is provided only in the cross-sectional region outside the transverse bore 16 and can thus only be seen in the lower half of FIG. 2B. The annular collar 60 ensures that, if the switching process is too slow the control slide 41' does not remain in a central position, due to pneumatic short-circuiting between the transverse bores 17, 18, which would result in a failure of the control of the consumer. Due to the pressure differential on both sides of the outer annular collar 59 and, as a result, due to an additional axial force acting on the control slide 41'; said pneumatic short circuit is prevented, even if the spring force of the helical pressure spring 31 is inadequate and/or if the pressure in the pressure chamber 33 is inadequate, which means that there is achieved an improvement in operational safety.

The seal between the outer annular collar 59 and the inner annular collar 60 does not necessarily have to be of the sliding variety; a narrow gap dimension is sufficient.

Figure 3A:
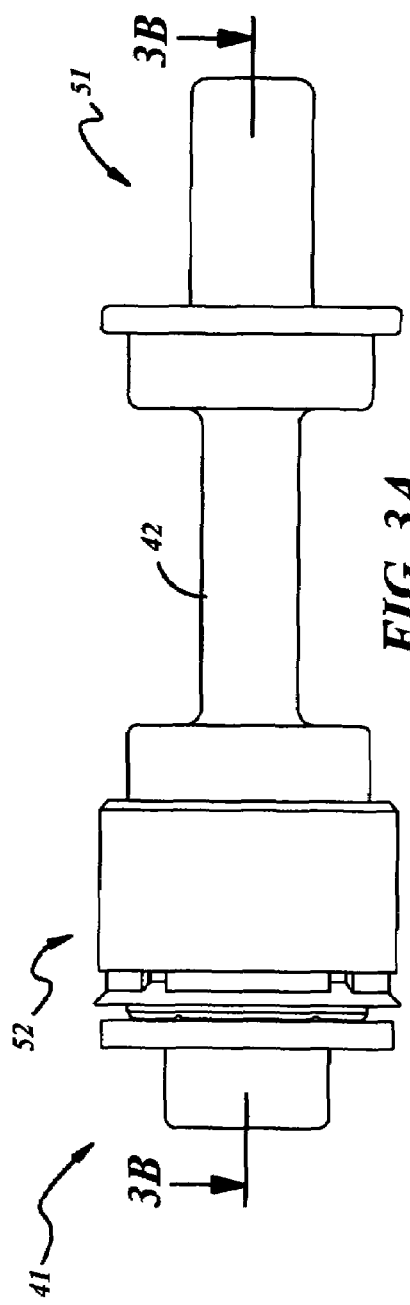
FIG. 3 shows the control piston of the multi-way valve according to FIG. 2 in an enlarged illustration
   a) in a side elevational view of the longitudinal axis
   b) in a cross-section along line 3B-3B as shown in 3A
   c) in the enlarged fragmentary detail in area 3C as shown in FIG. 3B
Figure 3B:
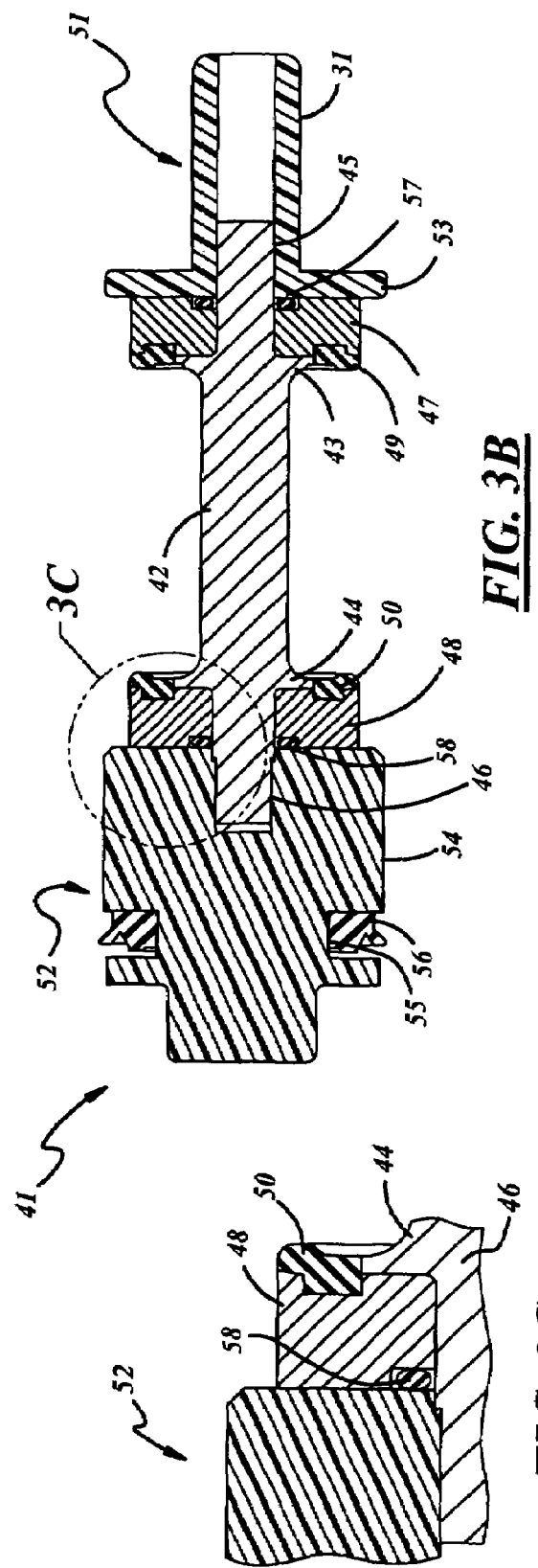
Figure 3C:
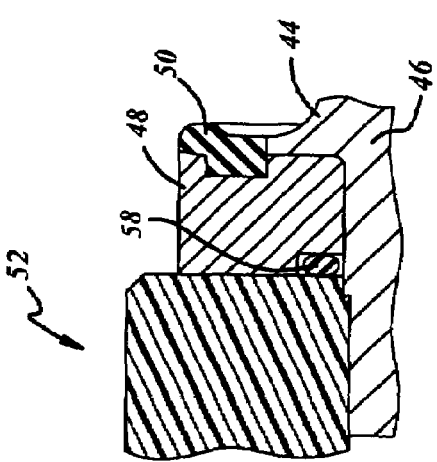

Reference is now made to FIGS. 3A, 3B and 3C which show the control piston 41 according to FIG. 2A in greater detail. The control piston 41 comprises a piston rod 42 which comprises two contact shoulders 43, 44 and two cylindrical seat portions 45, 46. The diameter of the contact shoulders is dimensioned in such a way that the piston rod 42 can be passed through the shoulder ring 26 of the cylindrical bore 25 of the housing 12. Annular disc shaped sealing members 47, 48 which, towards their insides, are provided with elastomeric sealing elements 49, 50, have been slid from the outside on to the cylindrical seat regions 45, 46. The sealing elements 49, 50 rest against the above mentioned sealing shoulders 29, 30. The sealing members 47, 48 are held on the seat regions 45, 46 entirely by a press fit and, like the piston rod 42, are made from metal. Two guiding members 51, 52 which are of different designs and which, in turn, are axially supported on the sealing members 47, 48 have also been slid by way of a press fit onto the seat regions 45, 46. The guiding member 51 has a disc shaped seal-less guiding portion 53 and a hollow-cylindrical holding portion 31 for guiding the above mentioned helical pressure spring 32 which is not illustrated. The guiding member 52, in the guiding portion 54, comprises an annular groove 55 which accommodates a sealing ring 56 which closes the above mentioned cylindrical chamber 33 against the ventilation pressure of the housing. As can be seen in the enlarged detail of FIG. 3C, O-ring seal 58 between the sealing member 48 and the guiding member 52 has been slid onto the seat portion 46 of the piston rod 42. Similarly, O-ring seal 57 between the sealing member 47 and the guide member 57 has been slid onto the seat portion 45 of the piston rod 42.

Furthermore, the housing has the transverse bore 19 for externally supplying the pre-control valve 15 via the adapter block 14, as well as the transverse bore 20 for ventilating the pre-control valve 15 via the adapter block 14. It is also possible for the pre-control valve 15 to be supplied internally via the adapter block 14 with the operating pressure of the main valve.

A feature of the invention pertains to the construction and the resulting assembly of the control piston 41 which, apart from the seals 57, 58, includes of five functional parts which are mounted axially inside the housing 12 by way of a press fit prior to the cover part 13 and the adapter part 14 being bolted on to the housing 12. The production and assembly of the inventive 3/2-way valve thus become less expensive.

Whereas, when the control pressure for the pressure chamber 33 is interrupted, the illustrated embodiment assumes the illustrated position as a result of the effect of the helical pressure spring 32 and thus corresponds to the NC (normally closed) valve type in the case of which the work device is disconnected from the compressed air supply when the control pressure is interrupted. It is also possible to use a modified embodiment which, with the same positioning of the connections at the transverse bores 16, 17, 18, by changing the sides of the control slide 41 and of the cover and adapter parts 13, 14, 15, becomes a NO (normally open) valve type in the case of which, if the control pressure for a pressure chamber then positioned on the right is interrupted, the effect of the helical pressure spring then positioned on the left would cause the central bore to be permanently connected to the compressed air supply. Internal compressed air channels for supplying the pre-control valve in the housing 12 would not be affected hereby, whereas outer compressed air channels for supplying the pre-control valve would have to be adapted.

Other variations and modifications are possible without departing from the scope and spirit of the present invention as defined by the appended claims.

The embodiments in which an exclusive property or privilege is claimed are defined as follows:

1. A multi-way valve comprising:
   a housing being a stepped bore with a reduced diameter central shoulder ring area and two end piston guiding regions; axially spaced transverse bores in said housing intersecting said stepped bore at both end piston guiding sections and reduced diameter central shoulder ring area;
   a piston having a piston rod and two opposing guide members at opposite ends of the piston rod for guiding the piston in the bore; said two opposing piston guide members being press fitted onto the opposite ends of the piston rod from the respective opposite ends and having sealing members for sealing against the reduced diameter central shoulder ring area; and
   said piston having a central solid collar which is slideably and sealingly arranged with respect to the reduced diameter central shoulder ring area.

2. A multi-way valve as defined in claim 1 further comprising:
   said reduced diameter central shoulder ring having an inner annular collar which is arranged to be in sliding and sealing contact about said solid collar on said piston.

3. A multi-way valve having a housing with a stepped bore which forms two piston guiding regions and a shoulder ring with two sealing shoulders; a first, second and central transverse bores which are spaced along with a cylindrical bore and which end in the cylindrical bore; a control piston which comprises a piston rod and sealing members secured thereon; wherein the piston rod has supporting shoulders for axially supporting the sealing members; wherein, depending on the position, one sealing member rests against one of the sealing shoulders for the purpose of sealing off a first transverse bore from a central transverse bore and wherein the other sealing member is disengaged from the associated sealing shoulder for the purpose of providing fluid communication between the central transverse bore and a second transverse bore said multi-way valve comprising:
   guiding members for guiding the control piston in the bore being press fitted onto opposite ends of the piston rod from the respective opposite ends;
   the sealing members being press fitted on the piston rod and being directly axially supported on the supporting shoulders of the piston rod; and
   wherein each guiding member being axially supported via one of said sealing members on one of said supporting shoulders of the piston rod.

4. A multi-way valve having a housing with a stepped bore which forms two piston guiding regions and a shoulder ring with two sealing shoulders; a first, second and central transverse bores which are spaced along with a cylindrical bore and which end in the cylindrical bore; a control piston which comprises a piston rod and sealing members secured thereon; wherein the piston rod has supporting shoulders for axially supporting the sealing members; wherein, depending on the position, one sealing member rests against one of the sealing shoulders for the purpose of sealing off a first transverse bore from a central transverse bore and wherein the other sealing member is disengaged from the associated sealing shoulder for the purpose of providing fluid communication between the central transverse bore and a second transverse bore said multi-way valve comprising:
   guiding members for guiding the control piston in the bore being press fitted onto opposite ends of the piston rod from the respective opposite ends; and
   the sealing members being press fitted on the piston rod and being directly axially supported on the supporting shoulders of the piston rod.

5. A multi-way valve as defined in claim 4 further comprising:
   said piston rod being provided with an outer annular solid collar which is positioned axially centrally between the sealing members and is slideably and sealingly arranged with respect to the shoulder ring.

6. A multi-way valve as defined in claim 4 further comprising:
   said shoulder ring having an inner annular collar which is arranged axially centrally between the sealing shoulders and which is sealingly arranged about the piston rod.

7. A multi-way valve as defined in claim 4 further comprising:
   said shoulder ring having an inner annular collar; and
   said piston rod being provided with an outer annular solid collar which within the operating range of the control piston is sealingly arranged to the interior of the inner annular collar.

8. A multi-way valve as defined in claim 4 further comprising:
   each guiding member being axially supported by supporting shoulders of the piston rod.

9. A multi-way valve as defined in claim 8 further comprising:
   each guiding member being axially supported via a respective sealing member that is annular disc shaped on the supporting shoulders.

10. A multi-way valve as defined in claim 4 further comprising:
   one of the guiding members being axially and yieldably supported via a helical pressure spring against a housing cover for closing the cylindrical bore.

11. A multi-way valve as defined in claim 10 further comprising:
   another of the guiding members being sealed by sealing means relative to its piston guiding region for the purpose of forming a pressure chamber in the housing.

12. A multi-way valve as defined in claim 10 further comprising:
the guiding members being made from plastic material.

13. A multi-way valve as defined in claim 12 further comprising:
the sealing members being made of metallic material and carrying elastomeric sealing elements.

14. A multi-way valve as defined in claim 13 further comprising:
O-rings being interposed between and forming a seal between the sealing members and the guiding members on the piston rod.

15. A multi-way valve as defined in claim 14 further comprising:
said housing being a light metal pressure die casting.

16. A multi-way valve as defined in claim 15 further comprising:
the central transverse bore ending in a reduced diameter section of the cylindrical bore in the region of the shoulder ring.

17. A multi-way valve as defined in claim 16 further comprising:
said piston rod being provided with an outer annular solid collar which is positioned axially centrally between the sealing members and is slideably and sealingly arranged to the interior of the shoulder ring.

18. A multi-way valve as defined in claim 16 further comprising:
said shoulder ring having an inner annular collar which is arranged axially centrally between the sealing shoulders and which is sealingly arranged about the piston rod.

19. A multi-way valve as defined in claim 16 further comprising:
said shoulder ring having an inner annular collar; and
said piston rod being provided with an outer annular solid collar which within the operating range of the control piston is sealingly arranged with respect to the inner annular collar.

* * * * *